US010848891B2

(12) United States Patent
Khaleghimeybodi et al.

(10) Patent No.: US 10,848,891 B2
(45) Date of Patent: Nov. 24, 2020

(54) REMOTE INFERENCE OF SOUND FREQUENCIES FOR DETERMINATION OF HEAD-RELATED TRANSFER FUNCTIONS FOR A USER OF A HEADSET

(71) Applicant: Facebook Technologies, LLC, Menlo Park, CA (US)

(72) Inventors: Morteza Khaleghimeybodi, Bothell, WA (US); Pablo Francisco Faundez Hoffmann, Redmond, WA (US)

(73) Assignee: Facebook Technologies, LLC, Melno Park, CA (US)

( * ) Notice: Subject to any disclaimer, the term of this patent is extended or adjusted under 35 U.S.C. 154(b) by 0 days.

(21) Appl. No.: 16/390,405

(22) Filed: Apr. 22, 2019

(65) Prior Publication Data

US 2020/0336856 A1    Oct. 22, 2020

(51) Int. Cl.
| H04S 7/00 | (2006.01) |
| H04R 5/033 | (2006.01) |
| H04R 5/04 | (2006.01) |
| H04R 3/00 | (2006.01) |
| H04R 1/40 | (2006.01) |

(52) U.S. Cl.
CPC ............ H04S 7/301 (2013.01); H04R 1/406 (2013.01); H04R 3/005 (2013.01); H04R 5/033 (2013.01); H04R 5/04 (2013.01); *H04R 2460/13* (2013.01); *H04S 2400/15* (2013.01); *H04S 2420/01* (2013.01)

(58) Field of Classification Search
CPC .. H04S 7/301; H04S 2400/15; H04S 2420/01; H04R 1/406; H04R 3/005; H04R 5/033; H04R 5/04; H04R 2460/13

USPC ................... 381/1, 2, 17–19, 303, 310, 313
See application file for complete search history.

(56) References Cited

U.S. PATENT DOCUMENTS

| 9,277,333 | B2* | 3/2016 | Aubreville | ........... H04R 25/407 |
| 9,648,438 | B1* | 5/2017 | Petrov | ..................... H04S 7/303 |
| 2011/0091057 | A1* | 4/2011 | Derkx | .................. H04R 25/407 381/313 |
| 2012/0300956 | A1* | 11/2012 | Horii | ...................... H04R 5/033 381/71.6 |
| 2012/0328107 | A1 | 12/2012 | Nystroem et al. | |

(Continued)

FOREIGN PATENT DOCUMENTS

| ES | 2517765 A1 | 11/2014 |
| WO | WO 2016/145261 A1 | 9/2016 |

OTHER PUBLICATIONS

U.S. Appl. No. 15/702,680, filed Sep. 12, 2017, Mehra et al.
(Continued)

*Primary Examiner* — William A Jerez Lora
(74) *Attorney, Agent, or Firm* — Fenwick & West LLP

(57) ABSTRACT

A headset comprises a frame and an audio system. The audio system includes a microphone assembly positioned on the frame in a detection region, the detection region external to an ear of a user wearing the headset, and within a threshold distance from an ear canal of the ear, the microphone assembly configured to detect an audio signal emitted from an audio source, wherein the audio signal detected at the detection region is within a threshold degree of similarity of a sound pressure wave at the ear canal of the user, and an audio controller configured to determine a set of head-related transfer functions (HRTFs) based in part on the detected audio signal.

20 Claims, 6 Drawing Sheets

(56) References Cited

U.S. PATENT DOCUMENTS

2014/0314259 A1* 10/2014 Aubreville ........... H04R 25/552
                                                       381/313
2016/0217781 A1    7/2016 Zhong et al.
2019/0058938 A1    2/2019 Miller et al.
2019/0394586 A1* 12/2019 Pedersen .............. H04R 25/554

OTHER PUBLICATIONS

U.S. Appl. No. 15/967,924, filed May 1, 2018, Mehra et al.
U.S. Appl. No. 16/015,879, filed Jun. 22, 2018, Mehra et al.
Garas, J. "Adaptive 3D Sound Systems." Eindhoven: Technische Universiteit Eindhoven, Doctoral Thesis, 1999, pp. 1-83.
PCT International Search Report and Written Opinion, PCT Application No. PCT/US2020/029139, dated Jul. 16, 2020, 16 pages.

* cited by examiner

US 10,848,891 B2

REMOTE INFERENCE OF SOUND FREQUENCIES FOR DETERMINATION OF HEAD-RELATED TRANSFER FUNCTIONS FOR A USER OF A HEADSET

BACKGROUND

The present disclosure generally relates to determination of head-related transfer functions (HRTFs) and specifically to remote inference of sound frequencies for determination of HRTFs for a user of a headset.

A sound perceived at two ears can be different, depending on at least one of: a direction of a sound, a location of a sound source with respect to each ear, and an anatomy of user's head and/or body, as well as on the surroundings of a room in which the sound is perceived. Humans can determine a location of the sound source by comparing the sound perceived at each ear. In a type of "spatial sound" system, a plurality of speakers reproduce the directional aspects of sound using HRTFs. A HRTF represents the sound transmission from a sound source in free field to the ears of a person. HRTFs encode the directional information of a sound source in their interaural time and intensity differences as well as in their audio frequency response. HRTFs vary from person to person, and personalized HRTFs for a user enable the user to experience a superior spatial sound quality, when delivering audio content to the user.

Calibration systems for determining HRTFs may typically include a microphone that is placed inside the ear canal of a user. By measuring an audio signal in the ear canal in response to sound sources in the local area, HRTFs can be determined and customized for the user. However, this is not a comfortable or convenient user experience.

SUMMARY

An audio system for remote inference of low sound frequencies for determination of HRTFs for a wearer of a headset. The audio system is configured to generate and/or customize a set of HRTFs for a user of the headset. The HRTFs may be used to generate audio content for a user of the headset. According to some embodiments, the headset is an artificial reality headset.

The audio system includes a microphone assembly positioned on a frame (of the headset) in a detection region. The detection region is external to an ear of a user wearing the headset, and within a threshold distance from an ear canal of the ear. The microphone assembly is configured to detect an audio signal emitted from an audio source. The audio signal detected at the detection region is within a threshold degree of similarity of a sound pressure wave at the ear canal of the user. Additionally, the audio system also includes an audio controller configured to determine a set of head-related transfer functions (HRTFs) based in part on the detected audio signal.

In some embodiments, the audio system performs a method. The method comprises detecting, via a microphone assembly positioned within a detection region on a frame of a headset, an audio signal emitted from an audio source. The detection region is external to an ear of a user wearing the headset and is within a threshold distance from an ear canal of the user, and the audio signal detected at the detection region is within a threshold degree of similarity of a sound pressure wave at the ear canal. The method further comprises determining, via an audio controller, a set of HRTFs based in part on the detected audio signal.

Figure 1:
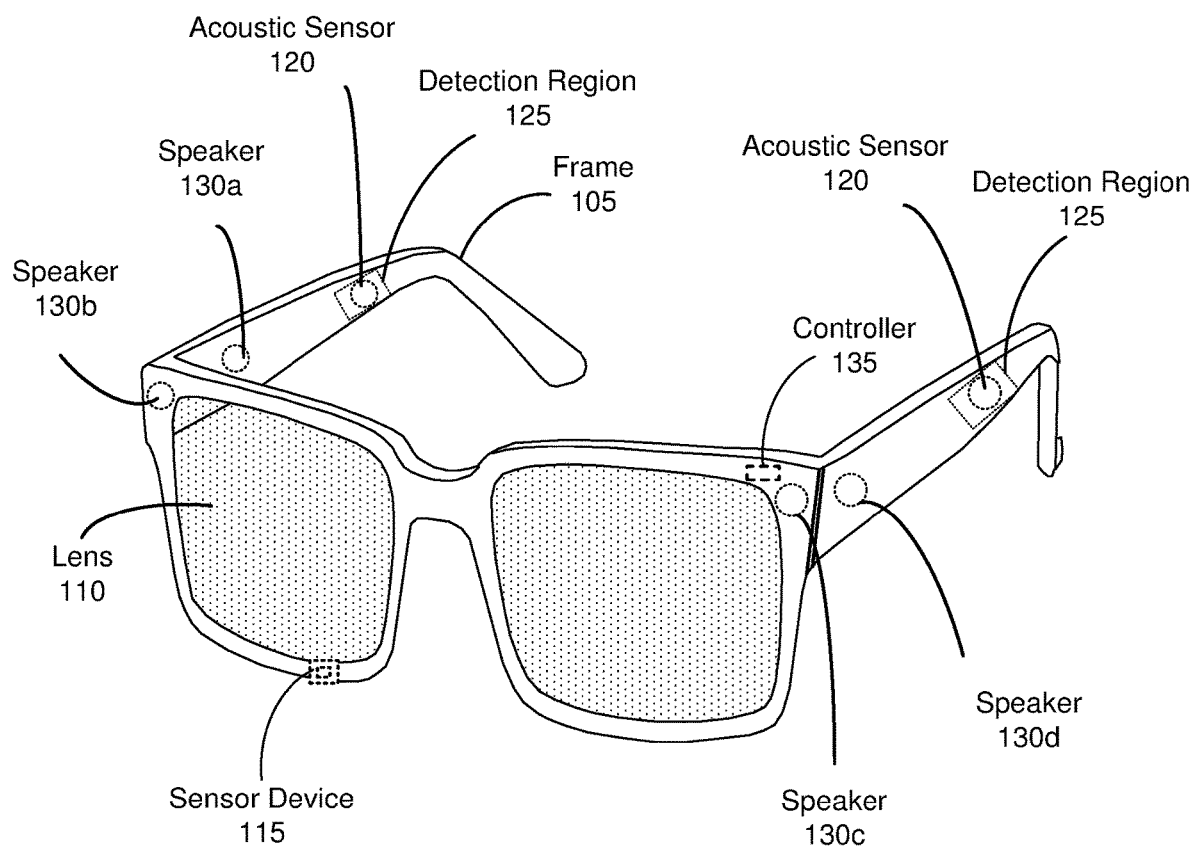
FIG. 1 is an example illustrating a headset including an audio system, according to one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

The human pinna acts like an individualized acoustic filter, which shapes the frequency response of the incoming sound depending on the sound direction. For humans this function is critical in 3D sound localization. Therefore, collecting the sound pressure at the entrance of an ear canal, where all localization cues can be accurately captured, is important. But, due to, e.g., industrial design concerns, it is often not desirable to have a microphone at the entrance of the ear canal. Various embodiments are discussed herein of an audio system that infers sound pressure at the entrance to the ear canal based on sound pressure detected at a location remote from the entrance to the ear canal. The audio system uses the detected sound pressure for determination of head-related transfer functions (HRTFs) for a wearer of a headset. The audio system presents audio content to the user using the determined HRTFs.

The audio system detects sound (i.e., sound pressure) to generate one or more head-related transfer functions (HRTFs) for a user. In some embodiments, the audio system includes a microphone assembly that includes a plurality of acoustic sensors and a controller. Each acoustic sensor is configured to detect sounds within a local area surrounding the microphone assembly. At least some of the plurality of acoustic sensors are coupled to a headset configured to be worn by the user, and at least one acoustic sensor for each ear of the user is located on a frame of the headset within a detection region that is within a threshold distance from an entrance of an ear canal of the corresponding ear. One or more audio sources within the local area emit audio signals that are detected by acoustic sensors on the headset. For each detection region, a first frequency band (e.g., at or below 2 kHz) of the audio signal detected by acoustic sensors in the detection region is used to infer sound pressure at an entrance of the ear canal in the detection region for the first frequency band. The first frequency band generally corresponds to relatively low/mid audio frequencies (e.g., 2 kHz or less). Audio signals in the first frequency band detected at the detection region are within a threshold degree of similarity (e.g., substantially the same) to sound pressure waves of the first frequency band at the entrance to the ear canal of the user. This relation occurs, for example, because low/mid frequency sound pressure waves have less directional dependence than sound pressure waves at higher frequencies. For audio signals (e.g., above 2 kHz) outside of the first frequency band, directional dependence increases and there is less similarity (i.e., an increase in error) between the detected audio signal at the acoustic sensor and the corresponding pressure wave at the entrance to the ear canal. The controller may account for the increased error for frequencies outside of the first frequency band using, e.g., calibration, template for higher-frequency HRTFs, etc. The controller may generate one or more HRTFs using the detected audio signals. The controller may then instruct the speaker assembly to present audio content to the use using the generated HRTF s.

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including headset connected to a host computer system, a standalone headset, a mobile device or computing system, or any other hardware platform capable of providing artificial reality content to one or more viewers.

Headset Device Configuration

FIG. 1 is an example illustrating a headset 100 including an audio system, according to one or more embodiments. The headset 100 presents media to a user. In one embodiment, the headset 100 may be a near-eye display (NED). Examples of media presented by the headset 100 include one or more images, video, audio, or some combination thereof. The headset 100 may include, among other components, a frame 105, one or more lenses 110, a sensor device 115, and an audio system. While FIG. 1 illustrates the components of the headset 100 in example locations on the headset 100, the components may be located elsewhere on the headset 100, on a peripheral device paired with the headset 100, or some combination thereof.

The headset 100 may correct or enhance the vision of a user, protect the eye of a user, or provide images to a user. The headset 100 may be eyeglasses which correct for defects in a user's eyesight. The headset 100 may be sunglasses which protect a user's eye from the sun. The headset 100 may be safety glasses which protect a user's eye from impact. The headset 100 may be a night vision device or infrared goggles to enhance a user's vision at night. The headset 100 may be a near-eye display that produces VR, AR, or MR content for the user. Alternatively, the headset 100 may not include a lens 110 and may be a frame 105 with an audio system that provides audio (e.g., music, radio, podcasts) to a user.

The frame 105 includes a front part that holds the one or more lenses 110 and end pieces to attach to the user. The front part of the frame 105 bridges the top of a nose of the user. The end pieces (e.g., temples) are portions of the frame 105 that hold the headset 100 in place on a user (e.g., each end piece extends over a corresponding ear of the user). The length of the end piece may be adjustable to fit different users. The end piece may also include a portion that curls behind the ear of the user (e.g., temple tip, ear piece).

The one or more lenses 110 provides or transmits light to a user wearing the headset 100. The lens 110 may be prescription lens (e.g., single vision, bifocal and trifocal, or progressive) to help correct for defects in a user's eyesight. The prescription lens transmits ambient light to the user wearing the headset 100. The transmitted ambient light may be altered by the prescription lens to correct for defects in the user's eyesight. The one or more lenses 110 may be a polarized lens or a tinted lens to protect the user's eyes from the sun. The one or more lenses 110 may be one or more waveguides as part of a waveguide display in which image light is coupled through an end or edge of the waveguide to the eye of the user. The one or more lenses 110 may include an electronic display for providing image light and may also include an optics block for magnifying image light from the electronic display. The one or more lenses 110 is held by a front part of the frame 105 of the headset 100.

In some embodiments, the headset 100 may include a depth camera assembly (DCA) that captures data describing depth information for a local area surrounding the headset 100. In one embodiment, the DCA may include a structured light projector, an imaging device, and a controller. The captured data may be images captured by the imaging device of structured light projected onto the local area by the structured light projector. In one embodiment, the DCA may include two or more cameras that are oriented to capture portions of the local area in stereo and a controller. The captured data may be images captured by the two or more cameras of the local area in stereo. The controller computes the depth information of the local area using the captured data. Based on the depth information, the controller determines absolute positional information of the headset 100 within the local area. The DCA may be integrated with the headset 100 or may be positioned within the local area external to the headset 100. In the latter embodiment, the controller of the DCA may transmit the depth information to an audio system.

The sensor device 115 generates one or more measurement signals in response to motion of the headset 100. The sensor device 115 may be located on a portion of the frame 105 of the headset 100. The sensor device 115 may include a position sensor, an inertial measurement unit (IMU), or both. Some embodiments of the headset 100 may or may not include the sensor device 115 or may include more than one sensor device 115. In embodiments in which the sensor device 115 includes an IMU, the IMU generates IMU data based on measurement signals from the sensor device 115. Examples of sensor devices 115 include: one or more accelerometers, one or more gyroscopes, one or more magnetometers, another suitable type of sensor that detects motion, a type of sensor used for error correction of the IMU, or some combination thereof. The sensor device 115 may be located external to the IMU, internal to the IMU, or some combination thereof.

Based on the one or more measurement signals, the sensor device 115 estimates a current position of the headset 100 relative to an initial position of the headset 100. The estimated position may include a location of the headset 100 and/or an orientation of the headset 100 or the user's head wearing the headset 100, or some combination thereof. The orientation may correspond to a position of each ear relative to the reference point. In some embodiments, the sensor device 115 uses the depth information and/or the absolute positional information from a DCA to estimate the current position of the headset 100. The sensor device 115 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 100 from the sampled data. For example, the IMU integrates the measurement signals received from the accelerometers over time to estimate a velocity vector and integrates the velocity vector over time to determine an estimated position of a reference point on the headset 100. Alternatively, the IMU provides the sampled measurement signals to a console, which determines the IMU data. The reference point is a point that may be used to describe the position of the headset 100. While the reference point may generally be defined as a point in space, however, in practice the reference point is defined as a point within the headset 100.

The audio system detects sound to generate one or more HRTFs for a user. A HRTF characterizes how a sound is received by a user from a point in space. The one or more HRTFs may be associated with the user wearing the headset 100. The audio system of the headset 100 includes a microphone assembly, a speaker assembly, and a controller 135. Additional detail regarding the audio system is discussed with regards to FIG. 3.

The microphone assembly detects sounds within a local area surrounding the microphone assembly. The microphone assembly includes a plurality of acoustic sensors 120. The acoustic sensors 120 are sensors that detect air pressure variations due to a sound wave. Each acoustic sensor 120 is configured to detect sound and convert the detected sound into an electronic format (analog or digital). The acoustic sensors 120 may be acoustic wave sensors, microphones, sound transducers, or similar sensors that are suitable for detecting sounds. The microphone assembly includes at least two acoustic sensors 120 which are each positioned within a respective detection region 125 on the frame 105. Each detection region 125 is within a threshold distance from a corresponding entrance of an ear canal of the user. As illustrated the detection regions 125 are on the frame 105, but in other embodiments, they include areas not on the frame 105. While only two acoustic sensors 120 are illustrated, in other embodiments, the microphone array include additional acoustic sensors. The additional acoustic sensors may be used to provide better direction of arrival (DoA) estimation for the audio signals. In addition, the position of each additional acoustic sensor of the microphone assembly may vary. The additional acoustic sensors may be located within one or both detection regions 125, elsewhere on the frame 105, or some combination thereof. For example, additional acoustic sensors may be positioned along the length of the temples, across the bridge, above or below the lenses 110, or some combination thereof. The acoustic sensors of the microphone array may be oriented such that the microphone assembly is able to detect sounds in a wide range of directions surrounding the user wearing the headset 100.

The microphone assembly detects sounds within the local area surrounding the microphone assembly. The local area is the environment that surrounds the headset 100. For example, the local area may be a room that a user wearing the headset 100 is inside, or the user wearing the headset 100 may be outside and the local area is an outside area in which the microphone assembly is able to detect sounds. Detected sounds may be uncontrolled sounds or controlled sounds. Uncontrolled sounds are sounds that are not controlled by the audio system and happen in the local area. Examples of uncontrolled sounds may be naturally occurring ambient noise. In this configuration, the audio system may be able to calibrate the headset 100 using the uncontrolled sounds that are detected by the audio system. Controlled sounds are sounds that are controlled by the audio system. Examples of controlled sounds may be one or more signals output by an external system, such as a speaker, a speaker assembly, a calibration system, or some combination thereof. While the headset 100 may be calibrated using uncontrolled sounds, in some embodiments, the external system may be used to calibrate the headset 100 during a calibration process. Each detected sound (uncontrolled and controlled) may be associated with a frequency, an amplitude, a duration, or some combination thereof.

A detected audio signal may generally be divided into a first frequency band and one or more high frequency bands. The first frequency band generally corresponds to relatively low and possible mid-range acoustic frequencies. For example, the first frequency band may be 0-2 kHz, and the one or more high frequency bands covering frequencies more than 2 kHz. For each detection region 125, the first frequency band of the audio signal detected by acoustic sensors 120 in the detection region 125 is used to infer sound pressure at a corresponding entrance to the ear canal for the first frequency band. Audio signals in the first frequency band detected at the detection region are within a threshold degree of similarity to sound pressure waves of the first frequency band at the entrance to the ear canal of the user. The threshold degree of similarity may be such that they are substantially identical pressure waveforms (e.g., less than 1 dB difference, and/or within the just-noticeable difference (JND) threshold if perception is considered) over the first frequency band. This relation occurs, for example, because low/mid frequency sound pressure waves have less directional dependence than sound pressure waves at higher frequencies.

The controller 135 processes information from the microphone assembly that describes sounds detected by the microphone assembly. The information associated with each detected sound may include a frequency, an amplitude, and/or a duration of the detected sound. For each detected sound, the controller 135 performs a DoA estimation. The DoA estimation is an estimated direction from which the detected sound arrived at an acoustic sensor 120 and/or acoustic sensor 125 of the microphone assembly. If a sound is detected by at least two acoustic sensors of the microphone assembly, the controller 135 can use the known positional relationship of the acoustic sensors and the DoA estimation from each acoustic sensor to estimate a source location of the detected sound, for example, via triangulation. The accuracy of the source location estimation may increase as the number of acoustic sensors that detected the sound increases and/or as the distance between the acoustic sensors that detected the sound increases.

In some embodiments, the controller 135 populates an audio data set with information. The information may include a detected sound and parameters associated with each detected sound. Example parameters may include a frequency, an amplitude, a duration, a DoA estimation, a source location, or some combination thereof. Each audio data set may correspond to a different source location relative to the headset and include one or more sounds having that source location. This audio data set may be associated with one or more HRTFs for that source location. The one or more HRTFs may be stored in the data set. In alternate embodiments, each audio data set may correspond to several source locations relative to the headset 100 and include one or more sounds for each source location. For example, source locations that are located relatively near to each other may be grouped together. The controller 135 may populate the audio data set with information as sounds are detected by the microphone assembly. The controller 135 may further populate the audio data set for each detected sound as a DoA estimation is performed or a source location is determined for each detected sound.

In some embodiments, the controller 135 selects the detected sounds for which it performs a DoA estimation. The controller 135 may select the detected sounds based on the parameters associated with each detected sound stored in the audio data set. The controller 135 may evaluate the stored parameters associated with each detected sound and determine if one or more stored parameters meet a corresponding parameter condition. For example, a parameter condition may be met if a parameter is above or below a threshold value or falls within a target range. If a parameter condition is met, the controller 135 performs a DoA estimation for the detected sound. For example, the controller 135 may perform a DoA estimation for detected sounds that have a frequency within a frequency range, an amplitude above a threshold amplitude, a duration below a threshold duration, other similar variations, or some combination thereof. Parameter conditions may be set by a user of the audio system, based on historical data, based on an analysis of the information in the audio data set (e.g., evaluating the collected information of the parameter and setting an average), or some combination thereof. The controller 135 may create an element in the audio set to store the DoA estimation and/or source location of the detected sound. In some embodiments, the controller 135 may update the elements in the audio set if data is already present.

In some embodiments, the controller 135 may receive position information of the headset 100 from a system external to the headset 100. The position information includes a location of the headset 100 and an orientation of the headset 100 or the user's head wearing the headset 100. The position information may be defined relative to a reference point. The position information may be used in generating and/or customizing HRTFs for the user including determining a relative location of sound sources in the local area. Examples of external systems include an imaging assembly, a console (e.g., as described in FIG. 6), a simultaneous localization and mapping (SLAM) system, a depth camera assembly, a structured light system, or other suitable systems. In some embodiments, the headset 100 may include sensors that may be used for SLAM calculations, which may be carried out in whole or in part by the controller 135. The controller 135 may receive position information from the system continuously or at random or specified intervals. In other embodiments, the controller 135 receives the position information of the headset 100 using systems coupled to the headset 100. For example, a depth camera assembly coupled to the headset 100 may be used to provide the position information to the controller 135.

Based on parameters of the detected sounds, the controller 135 generates one or more HRTFs associated with the audio system. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. For example, in FIG. 1, the controller 135 generates at least one HRTF for each ear. The HRTFs include HRTFs generated using portions of the audio signal in the first frequency band, these HRTFs correspond to frequencies in the first frequency band. Higher-frequency HRTFs may be generated using a plurality of acoustic sensors (may include the acoustic sensors 120) that provide directional information, using acoustic sensors placed in the ear canal of the user, using acoustic sensors placed on the frame at other locations than that of the acoustic sensors 120, as shown in FIG. 1, using template higher-frequency HRTFs, or some combination thereof. In this manner, the controller 135 generates and/or updates a customized set of HRTFs for the user. The controller 135 uses the customized set of HRTFs to present audio content to the user. For example, the customized HRTFs can be used to create audio content that includes sounds that seem to come from a specific point in space. In some embodiments, the controller 135 may update one or more pre-existing HRTFs based on the DoA estimation of each detected sound. As the position of the headset 100 changes within the local area, the controller 135 may generate one or more new HRTFs or update one or more pre-existing HRTFs accordingly.

Figure 2:
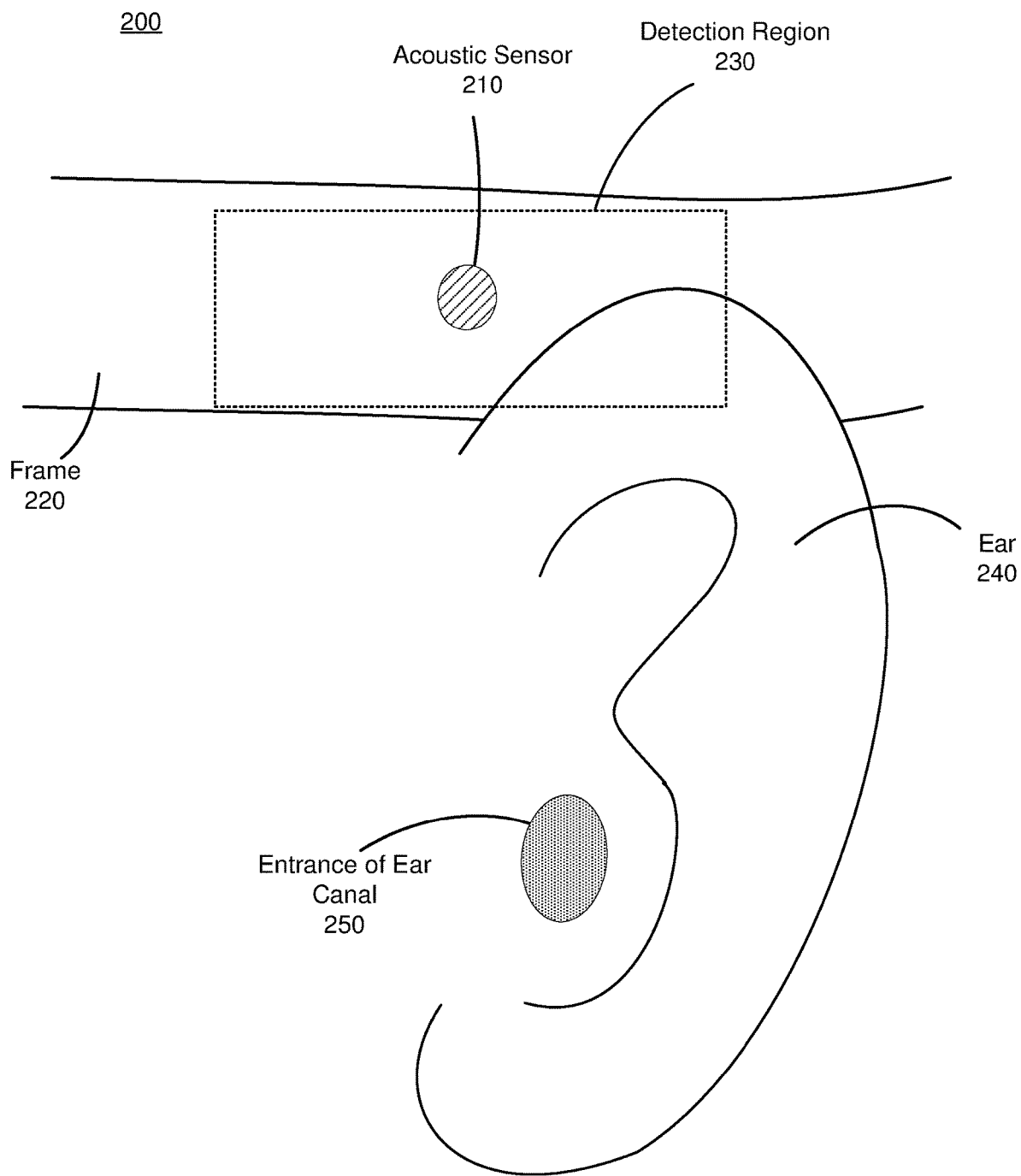
FIG. 2 is an example illustrating a portion of a headset including acoustic sensors, according to one or more embodiments.

FIG. 2 is an example illustrating a portion of a headset including acoustic sensors, according to one or more embodiments. The headset 200 may be an embodiment of the headset 100. The headset 200 includes an acoustic sensor 210 which may be an embodiment of the acoustic sensors 120. According to some embodiments, the acoustic sensors 210 are microphones each positioned on a portion of a frame 220 of the headset 200 at a detection region 230, and the detection region 230 is an embodiment of the detection region 125. While only one ear 240 is shown in FIG. 2, a portion of the headset 200 corresponding to another ear 240 of the user also includes the same configuration illustrated in FIG. 2, according to some embodiments. The headset 200 may have a different configuration of acoustic sensors than illustrated in FIG. 2. For example, in some embodiments, there are a greater number of acoustic sensors 210 located in the detection region 230. As illustrated in FIG. 2, a portion of the frame 220 of the headset 200 is positioned behind the pinna of each ear 240 to secure the headset 200 to the user.

The acoustic sensors 210 is positioned at a detection region 230 external to an entrance of the ear canal 250 of the user. A first frequency band (e.g., at or below 2 kHz) of the audio signal detected by the acoustic sensor 210 in the detection region is used to infer sound pressure waves at the entrance of the ear canal 250. Audio signals in the first frequency band detected at the detection region 230 are within a threshold degree of similarity (e.g., substantially the same) to sound pressure waves of the first frequency band at the entrance to the ear canal 250. This relation occurs, for example, because low/mid frequency sound pressure waves have less directional dependence than sound pressure waves at higher frequencies. For audio signals (e.g., above 2 kHz)

outside of the first frequency band, directional dependence increases and there is less similarity (i.e., an increase in error) between the detected audio signal at the acoustic sensor and the corresponding pressure wave at the entrance to the ear canal. For simplicity, the detection region 230 is illustrated on the frame 220, however, the detection region 230 may extend to areas not on the frame 220 that are within the threshold distance (e.g., closer to the entrance of the ear canal 250). In some embodiments, the detection region 230 is located within a threshold distance from a front portion of a helix of the ear 240.

As noted above, the threshold distance (e.g., 3 inches or less) may be a distance at which low-frequency audio signals measured within the detection region are within a threshold similarity of low-frequency sound pressure wave at the entrance of the ear canal 250. This threshold degree of similarity enables the inference of low-frequency pressure waves at the entrance of the ear canal 250, without placing a microphone in the ear canal of the user. The threshold degree of similarity may be such that they are substantially identical pressure waveforms (e.g., less than 1 dB difference, and/or within the JND threshold) over the first frequency band.

Portions of the audio signal in a first frequency band may be used to accurately and remotely infer sound pressure at the entrance of the ear canal 250. The inferred sound pressure waves at the entrance of the ear canal 250 of the user are used to generate and/or customize unique HRTFs for each ear of the user for frequencies in the first frequency band.

The configuration of the acoustic sensors 210 of the microphone assembly may vary. While the headset 200 is shown in FIG. 2 as having one acoustic sensor 210 for each ear 240 of the user, the number of acoustic sensors 210 may be increased. Increasing the number of acoustic sensors 210 may increase the amount of audio information collected and the sensitivity and/or accuracy of the audio information. For example, increasing the number of acoustic sensors 210 in the detection region 250 may improve a calibration involving generating and/or customizing HRTFs for the user based on inference of sound pressure waves within the first frequency band at the entrance of the ear canal 250. Additional acoustic sensors 210 located on the frame 220 outside of the detection region 250 are used to generate and/or customize higher-frequency HRTFs for the user, according to some embodiments. In further embodiments, the additional acoustic sensors 210 are part of an acoustic sensor array used to perform DoA estimations for generating and/or customizing higher frequency HRTFs.

In other embodiments, portions of the audio signal detected by the acoustic sensor 210 may also be used to collect information for frequencies above the first frequency band. For example, frequencies above the first frequency band may be above 2 kHz. As noted above, for frequencies higher than the first frequency band, directional dependence increases and there is less similarity (i.e., an increase in error) between the detected audio signal at the acoustic sensor 210 and the corresponding pressure wave at the entrance to the ear canal 250. In some embodiments, the increase in error may be offset by using data from additional acoustic sensors. The additional acoustic sensors may be placed anywhere on the frame 220, and in some embodiments, may also be within the detection region 230. The larger number of acoustic sensors allows for increased accuracy in DoA analysis, which can help offset the directional dependency associated with the higher frequencies.

Audio System Overview

Figure 3:
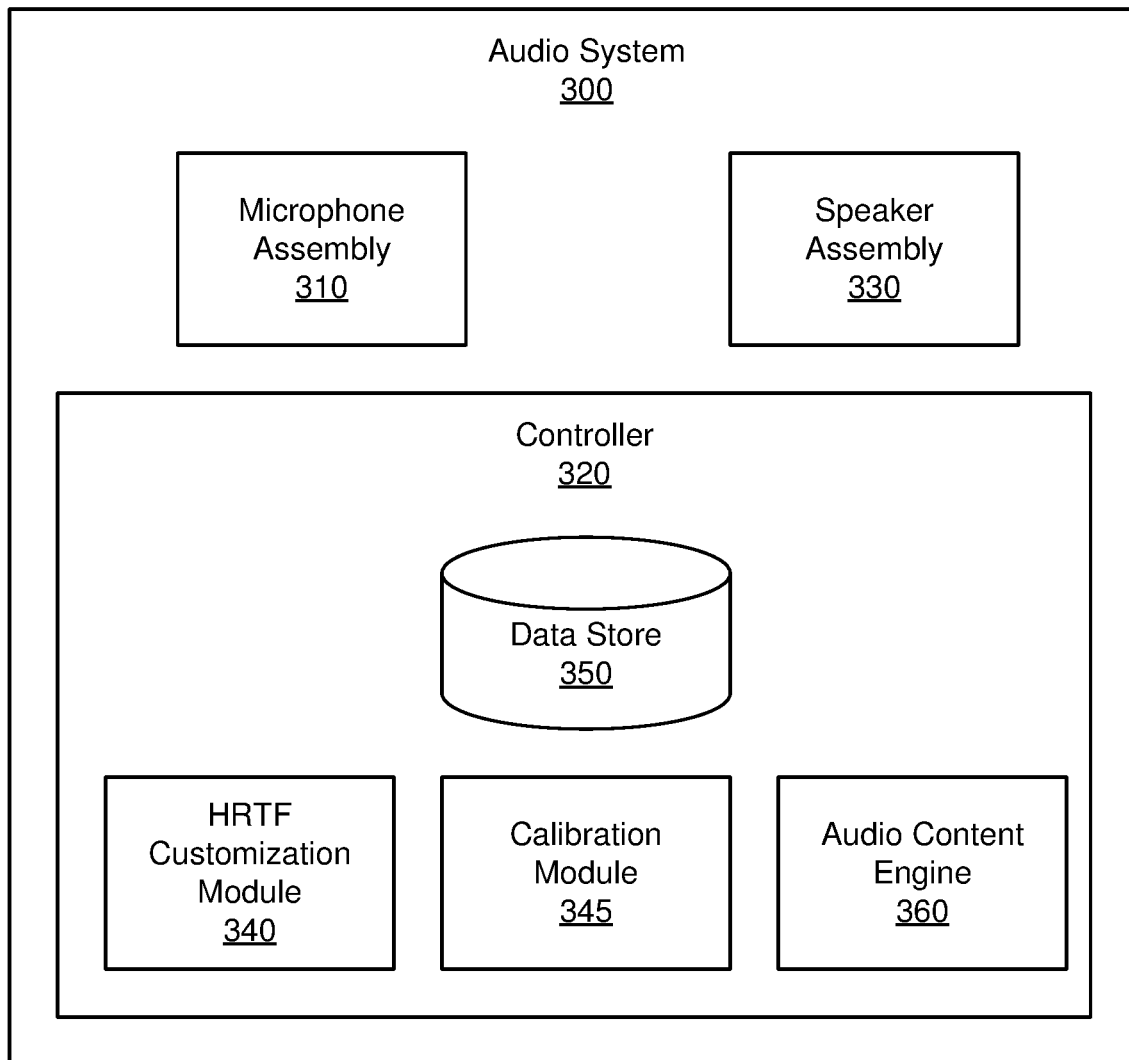
FIG. 3 is a block diagram of an audio system, according to one or more embodiments.

FIG. 3 is a block diagram of an audio system 300, according to one or more embodiments. The audio system in FIGS. 1 and 3 may be embodiments of the audio system 300. The audio system 300 detects sound to generate one or more HRTFs for a user. The audio system 300 may then use the one or more HRTFs to generate audio content for the user. In the embodiment of FIG. 3, the audio system 300 includes a microphone assembly 310, a controller 320, and a speaker assembly 330. Some embodiments of the audio system 300 have different components than those described here. Similarly, in some cases, functions can be distributed among the components in a different manner than is described here. For example, some or all of the controller 320 may be located on a server or console that is remote from the headset.

The microphone assembly 310 detects sounds within a local area surrounding the microphone assembly 310. The microphone assembly 310 may include a plurality of acoustic sensors that each detect air pressure variations of a sound wave and convert the detected sounds into an electronic format (analog or digital). The plurality of acoustic sensors include at least one acoustic sensor in each detection region associated with each ear of a user. The plurality of acoustic sensors may include embodiments of the acoustic sensors 120. The plurality of acoustic sensors may be positioned on a headset, e.g. headset 100, on a user, or some combination thereof. As described above, detected sounds may be uncontrolled sounds or controlled sounds. Each detected sound may be associated with audio information such as a frequency, an amplitude, a duration, or some combination thereof.

The speaker assembly 330 plays audio content in accordance with instructions from the controller 320. The speaker assembly 330 may include embodiments of the speakers 130 shown in FIG. 1. A speaker may be, e.g., a moving coil transducer, a piezoelectric transducer, some other device that generates an acoustic pressure wave using an electric signal, or some combination thereof. In some embodiments, the speaker assembly 330 also includes speakers that cover each ear (e.g., headphones, earbuds, etc.). In other embodiments, the speaker assembly 330 does not include any speakers that would occlude the ears of a user. In some embodiments, the speaker assembly 330 includes speakers that transmit audio content to the user using conduction methods other than air conduction, e.g. bone conduction, cartilage conduction or tragus conduction. Additional details regarding audio sources using conduction methods other than air conduction may be found at U.S. patent application Ser. Nos. 15/680, 836, 15/702,680, and 15/967,924 all of which are hereby incorporated by reference in their entireties.

Figure 6:
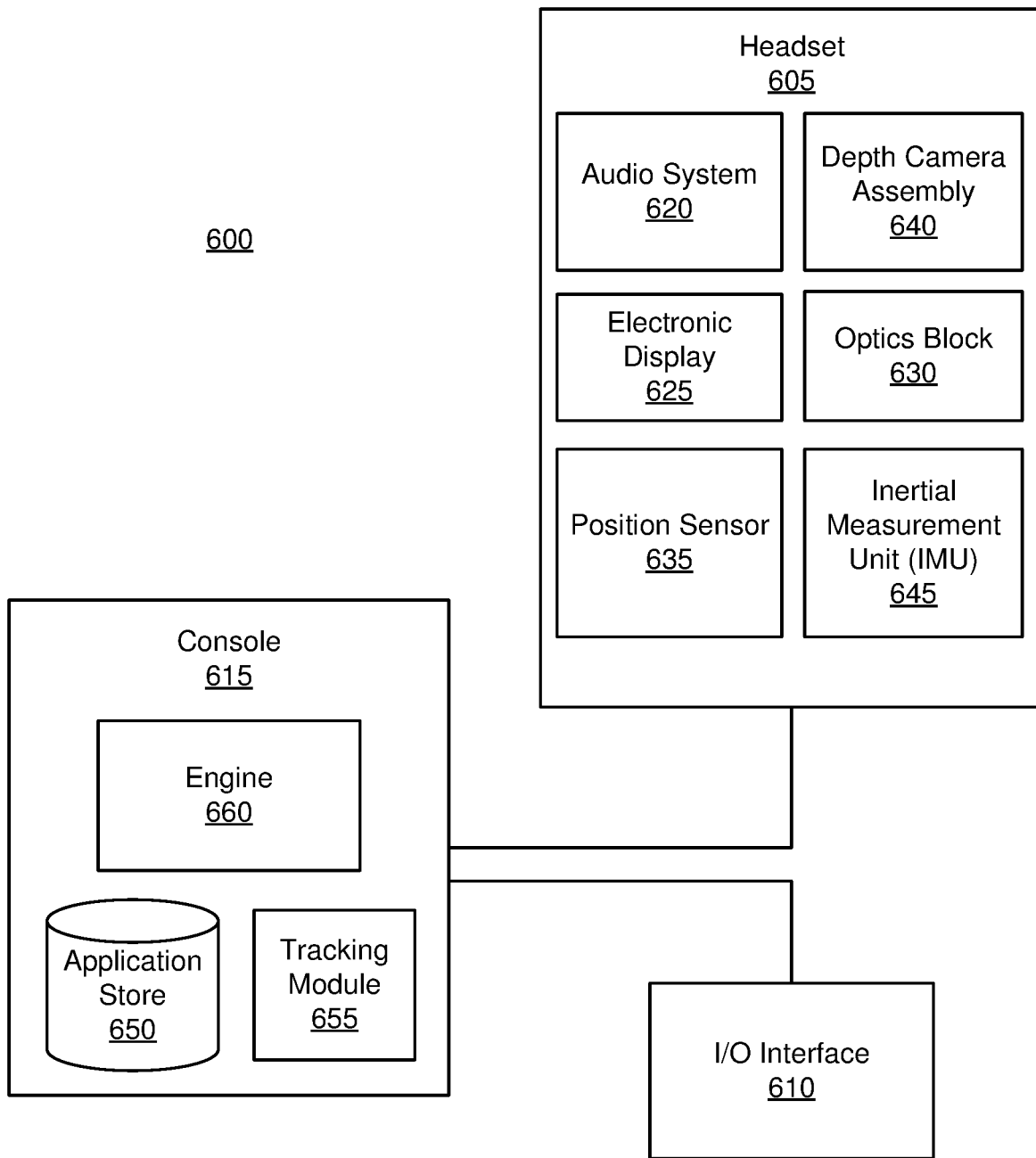
FIG. 6 is a system environment of a headset including an audio system, according to one or more embodiments.

The controller 320 controls components of the audio system 300. The controller 320 processes information from the microphone assembly 310 to determine a set of HRTFs that are customized to the user. The controller 320 may instruct the speaker assembly 330 to present audio content using the set of HRTFs. The controller 320 may be an embodiment of the controller 135. In the embodiment of FIG. 3, the controller 320 includes a HRTF customization module 340, a calibration module 345 a data store 350, an audio content engine 360. However, in other embodiments, the controller 320 may include different and/or additional components. Similarity, in some cases, functions can be distributed among the components in a different manner than is described here. For example, some or all of the functionality of the controller 320 may be performed by a console (e.g., as shown in FIG. 6).

The data store 350 stores data generated and/or used by the controller 320. The data may include detected audio signals by the microphone assembly 310, audio content to be played by the speaker assembly 330, HRTFs generated and/or customized by the HRTF customization module 340, other data relevant to the audio system 300, or some combination thereof, according to some embodiments. The data store 350 may include a data storage device. In some embodiments, the data storage device may be coupled to the frame of the headset. In other embodiments, the data storage device is external to the headset. In some embodiments, the data store 350 is part of a remote database that is accessed by the controller 320 via network communication.

The HRTF customization module 340 performs a DoA estimation for detected sounds at frequencies higher than the first frequency band (e.g., above 2 kHz), according to some embodiments. DoA estimation is an estimated direction from which a detected sound arrived at an acoustic sensor of the microphone assembly 310. If a sound is detected by at least two acoustic sensors of the microphone assembly, the controller 320 can use the positional relationship of the acoustic sensors and the DoA estimation from each acoustic sensor to estimate a source location of the detected sound, for example, via triangulation. The DoA estimation of each detected sound may be represented as a vector between an estimated source location of the detected sound and the position of the microphone assembly 310 within the local area. The estimated source location may be a relative position of the source location in the local area relative to a position of the microphone assembly 310. Additional details of a DoA estimation may be found at, e.g., U.S. patent application Ser. No. 16/015,879, which is hereby incorporated by reference in its entirety.

The position of the microphone assembly 310 may be determined by one or more sensors on a headset having the microphone assembly 310. In some embodiments, the controller 320 may determine an absolute position of the source location if an absolute position of the microphone assembly 310 is known in the local area. The position of the microphone assembly 310 may be received from an external system (e.g., an imaging assembly, an AR or VR console, a SLAM system, a depth camera assembly, a structured light system etc.). The external system may create a virtual model of the local area, in which the local area and the position of the microphone assembly 310 are mapped. The received position information may include a location and/or an orientation of the microphone assembly in the mapped local area. The controller 135 may update the mapping of the local area with determined source locations of detected sounds. The controller 320 may receive position information from the external system continuously or at random or specified intervals. In some embodiments, the controller 320 selects the detected sounds for which it performs a DoA estimation.

The HRTF customization module 340 generates and/or customizes one or more HRTFs. A HRTF characterizes how an ear of a person receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. The HRTF customization module 340 may generate and/or update HRTFs associated with frequencies in the first frequency band using portions of the audio signal detected by an acoustic sensor in a detection region. The HRTF customization module 340 may generate and/or update HRTFs associated with frequencies higher than the first frequency band using the audio signals captured by the microphone assembly, templates associated with HRTFs for frequencies higher than the first frequency band, or some combination thereof. In some embodiments, the HRTF customization module 340 generates and/or updates HRTFs associated with frequencies higher than the first frequency band using audio signal captured by microphones of the microphone assembly 310 located at positions other than that of the acoustic sensor 210, as shown in FIG. 2. In some embodiments, the HRTF customization module 340 uses machine learning techniques to generate and/or customize personalized HRTFs for the user. For example, a machine learning model may be trained to determine a direction of a sound source based on audio signals detected by the microphone assembly 310. In other embodiments, a machine learning model is trained to determine a direction of a sound source generating sounds at frequencies higher than the first frequency band based on audio signals detected by the microphone assembly 310. In some embodiments, a machine learning model is trained on audio signals captured by the microphone assembly 310 and training HRTFs generated by measuring audio signals with a microphone placed in the ear canal of a user.

The machine learning model can include any number of machine learning algorithms. Some other machine learning models that can be employed are linear and/or logistic regression, classification and regression trees, k-means clustering, vector quantization, etc. In some embodiments, the machine learning model includes deterministic methods that have been trained with reinforcement learning (thereby creating a reinforcement learning model).

The HRTF customization module 340 may generate a plurality of HRTFs for a single person, where each HRTF may be associated with a different source location, a different position of the person wearing the microphone assembly 310, or some combination thereof. As an example, the HRTF customization module 340 may generate two HRTFs for a user at a particular location and orientation of the user's head in the local area relative to a single source location. If the user turns his or her head in a different direction, the HRTF customization module 340 may generate two new HRTFs for the user at the particular location and the new orientation, or the HRTF customization module 340 may update the two pre-existing HRTFs. Accordingly, the HRTF customization module 340 generates HRTFs for different source locations, different positions of the microphone assembly 310 in a local area, or some combination thereof.

The calibration module 345 calibrates the audio system 300 for generation (and/or updating) of customized HRTFs. The calibration steps may include instructing the speaker assembly 330 and/or external speakers to generate controlled sounds with a predetermined timing that occur at different orientations relative to the microphone assembly 330. The calibration module 345 may instruct the microphone assembly 310 to detect audio signals emitted by the speaker assembly 330 and/or the external speakers, uncontrolled audio signals emitted by audio sources in a local area, or some combination thereof. The audio signals may be of specific frequencies and emitted by audio sources at different relative positions to the microphone assembly 320. In some embodiments, one or more template HRTFs are customized based on audio signals detected by the microphone assembly 310 during the calibration process.

In some embodiments, the calibration system 345 calibrates the audio system 300 in response to a degree of coherence between an audio signal emitted by the speaker assembly 330 and a measured audio signal detected by the microphone assembly 310 being above a threshold degree of coherence. For an emitted audio signal having frequencies within the first frequency band, the calibration system 345 calibrates the audio system 300 for the first frequency band, in response to the degree of coherence between the emitted audio signal and a corresponding measured audio signal being above a threshold degree of coherence. For emitted audio signals having higher frequencies, the calibration system 345 calibrates the audio system 300, in response to the degree of coherence between the emitted audio signal and the measured audio signal being above a threshold degree of coherence. In this case, the calibration system 345 only calibrates transfer functions between the speaker assembly 330 and the microphone assembly 310.

The audio content engine 360 generates an audio characterization configuration using the customized HRTFs. The audio characterization configuration is a function which the audio system 300 uses to synthesize a binaural sound that seems to come from a particular point in space. The audio content engine 360 may, e.g., fit an interpolating function to the HRTFs (e.g., a set of spherical harmonics), such that any given direction in space maps to a HRTF. Alternatively, the audio content engine 360 may generate a lookup table that maps different directions in space to the closest HRTFs. The audio characterization configuration can be used by the speaker assembly 330 for presenting audio content (e.g., surround sound). In some embodiments the audio content engine 360 instructs the speaker assembly 330 to present audio content in accordance with the audio characterization configuration.

Example Data

Figure 4:
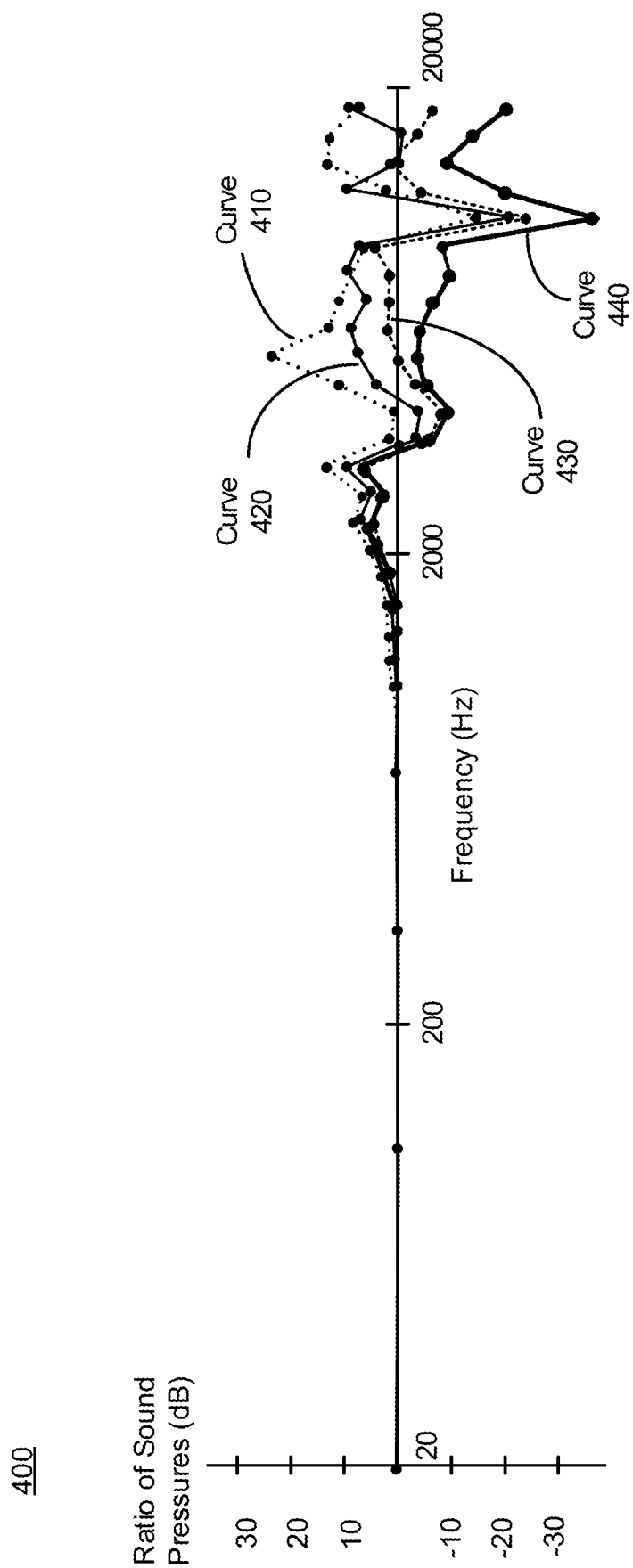
FIG. 4 is a graph illustrating a similarity ratio of sound pressure at an entrance of an ear canal to sound pressure in a detection region as a function of direction and frequency, according to one or more embodiments.

FIG. 4 is a graph 400 illustrating a similarity ratio of sound pressure at an entrance of an ear canal to sound pressure in a detection region as a function of direction and frequency, according to one or more embodiments. The graph includes curve 410, curve 420, curve 430, and curve 440. Curve 410 corresponds to a recording of an audio source in a position corresponding to an azimuthal angle of 0° and an elevational angle of 0° using spherical coordinate system, corresponding to the front of the user. Curve 420 corresponds to an audio source at a position corresponding to an azimuthal angle of 45° and an elevational angle of 0°. Curve 430 corresponds to an audio source at an audio source in a position corresponding to an azimuthal angle of 90° and an elevational angle of 45°. Curve 440 corresponds to an audio source at a position corresponding to an azimuthal angle of 180° and an elevational angle of 0°. The horizontal axis is in frequency (Hz) and the vertical axis is in decibels (dB). Accordingly, if the sound pressure at the opening of the ear canal is substantially the same as the sound pressure in the detection region, the ratio of the two values is ~one resulting in a value of zero dB (log of 1 is zero).

As is shown in FIG. 4, the audio signals detected by the acoustic sensor for frequencies in a first frequency band (e.g., 0-2 kHz) are within a threshold similarity to the detected audio signals in the ear canal for the different positions of the audio source. As such, the portions of the audio signals in the first frequency band detected by the acoustic sensor in the detection region may be used to infer a sound pressure wave at the entrance of the ear canal of the user. Since the wavelength of the audio signals in the first frequency band is large, the portions of the audio signals in the first frequency band measured at the detection region are not significantly affected by the small features of the helix and/or other parts of the anatomy of the ear. As such, the portions of the audio signals in the first frequency band measured at the detection region are within a threshold similarity to sound pressure waves in the ear canal of the user.

As shown in FIG. 4, the curves 410, 420, 430, and 440 begin to substantially diverge (recall that each curve is associated with a different direction) from each other for frequencies above about 2 kHz. The diverging curves are due to the directional dependency increasing with frequency.

Head-Related Transfer Function (HRTF) Personalization

Figure 5:
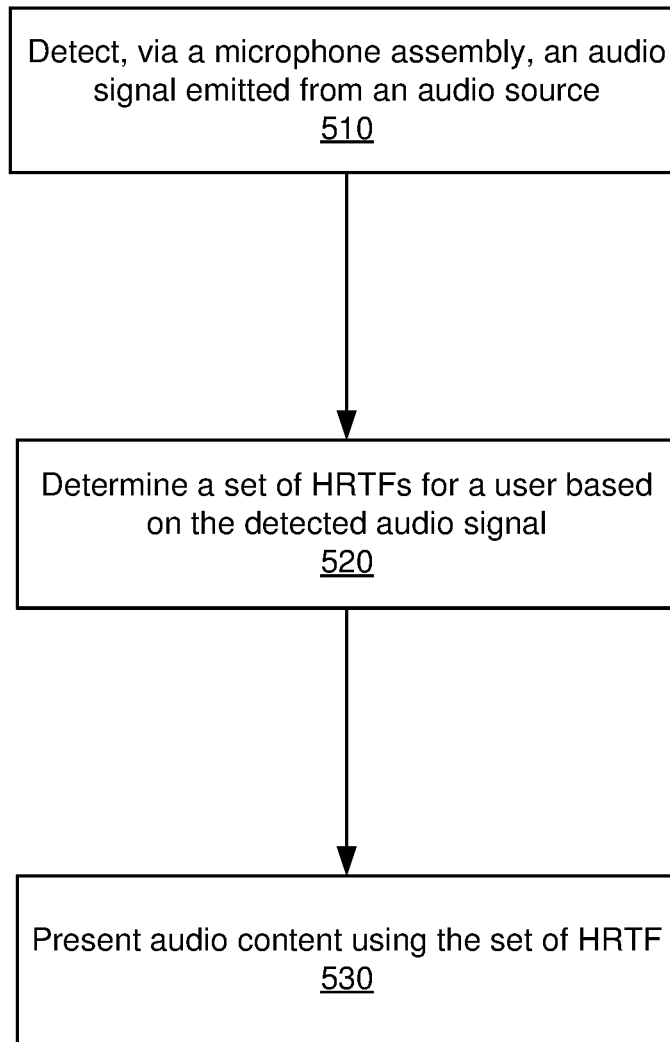
FIG. 5 is a flow chart illustrating a process for customizing a set of head-related transfer functions (HRTFs) for a user using a headset, according to one or more embodiments.

FIG. 5 is a flow chart illustrating a process for customizing a set of head-related transfer functions (HRTFs) for a user using a headset, according to one or more embodiments. In one embodiment, the process of FIG. 5 is performed by components of the audio system 300. Other entities may perform some or all of the steps of the process in other embodiments (e.g., a console). Likewise, embodiments may include different and/or additional steps, or perform the steps in different orders.

The audio system 300 detects 510 an audio signal emitted from an audio source. The audio system 300 detects the audio signal using a microphone assembly positioned within a detection region on a frame of a headset. The detection region is external to an ear of a user wearing the headset and is within a threshold distance from an ear canal of the user. Some or all of the detected signal is within a first frequency band (e.g., 0-2 kHz). The portion of the audio signal within the first frequency band that is detected at the detection region is within a threshold degree of similarity of a sound pressure wave at the ear canal over the same frequency band.

The audio system 300 determines 520 a set of HRTFs based in part on the detected audio signal. The set of HRTFs may be determined using a controller. At least some of the HRTFs are determined using the inferred sound pressure at the entrance to the ear canal for the first frequency band. For HRTFs associated with frequencies that are higher than the first frequency band, the audio system 300 may use, e.g., template HRTFs, audio signals captured by additional acoustic sensors of the microphone array, sound field decomposition, machine learning, etc. In some embodiments, the audio system 300 uses a DoA estimation in determining HRTFs associated with frequencies that are higher than the first frequency band.

The audio system 300 presents 530 audio content using the set of HRTFs. As described above with regard to FIG. 3, the audio system 300 generates an audio characterization configuration using the determined HRTFs. The audio system 300 presents audio content to the user using the audio characterization configuration and the speaker assembly 330.

If the position of the user wearing the headset within the local area, the audio system may generate one or more new HRTFs or update one or more pre-existing acoustic transfer functions accordingly. The process 500 may be continuously repeated as a user wearing the headset moves through the local area, or the process 500 may be initiated upon detecting sounds via the microphone assembly.

Example System Environment

FIG. 6 is a system environment of a headset including an audio system, according to one or more embodiments. The system 600 may operate in an artificial reality environment. The system 600 shown in FIG. 6 includes a headset 605 and an input/output (I/O) interface 610 that is coupled to a console 615. The headset 605 may be an embodiment of the headset 100. While FIG. 6 shows an example system 600 including one headset 605 and one I/O interface 610, in other embodiments any number of these components may be included in the system 600. For example, there may be multiple headsets 605 each having an associated I/O interface 610 with each headset 605 and I/O interface 610 communicating with the console 615. In alternative configurations, different and/or additional components may be included in the system 600. Additionally, functionality described in conjunction with one or more of the components shown in FIG. 6 may be distributed among the components in a different manner than described in conjunction with FIG. 6 in some embodiments. For example, some or all of the functionality of the console 615 is provided by the headset 605.

In some embodiments, the headset 605 may correct or enhance the vision of a user, protect the eye of a user, or provide images to a user. The headset 605 may be eyeglasses which correct for defects in a user's eyesight. The headset 605 may be sunglasses which protect a user's eye from the sun. The headset 605 may be safety glasses which protect a user's eye from impact. The headset 605 may be a night vision device or infrared goggles to enhance a user's vision at night. Alternatively, the headset 605 may not include lenses and may be just a frame with an audio system 620 that provides audio (e.g., music, radio, podcasts) to a user.

In some embodiments, the headset 605 may be a head-mounted display that presents content to a user comprising augmented views of a physical, real-world environment with computer-generated elements (e.g., two dimensional (2D) or three dimensional (3D) images, 2D or 3D video, sound, etc.). In some embodiments, the presented content includes audio that is presented via an audio system 620 that receives audio information from the headset 605, the console 615, or both, and presents audio data based on the audio information. In some embodiments, the headset 605 presents virtual content to the user that is based in part on a real environment surrounding the user. For example, virtual content may be presented to a user of the eyewear device. The user physically may be in a room, and virtual walls and a virtual floor of the room are rendered as part of the virtual content. In the embodiment of FIG. 6, the headset 605 includes an audio system 620, an electronic display 625, an optics block 630, a position sensor 635, a depth camera assembly (DCA) 640, and an inertial measurement (IMU) unit 645. Some embodiments of the headset 605 have different components than those described in conjunction with FIG. 6. Additionally, the functionality provided by various components described in conjunction with FIG. 6 may be distributed differently among the components of the headset 605 in other embodiments or be captured in separate assemblies remote from the headset 605.

The audio system 620 detects sound to generate one or more HRTFs for a user. The audio system 620 may then use the one or more HRTFs to generate audio content for the user. The audio system 620 may be an embodiment of the audio system 300. As described above with regard to FIG. 3, the audio system 620 may include a microphone assembly, a controller, and a speaker assembly, among other components. The microphone assembly detects sounds within a local area surrounding the microphone assembly. The plurality of acoustic sensors may be positioned on a headset (e.g., headset 100), on a user (e.g., in an ear canal of the user), on a neckband, or some combination thereof. At least two of the acoustic sensors are each positioned at a detection region within a threshold distance from an entrance of each ear canal of the user, according to some embodiments. Detected sounds may be uncontrolled sounds or controlled sounds. The controller may perform a DoA estimation for the higher-frequency, above 2 kHz, sounds detected by the microphone assembly. In some embodiments, based in part on the DoA estimations of the detected higher-frequency sounds and parameters associated with the detected sounds, the controller generates and/or updates one or more HRTFs associated with the source locations of the detected sounds. The controller also generates and/or updates one or more HRTFs based at least in part on detected low-frequency audio signals measured at the detection region by the low-frequency audio sensors. The controller may generate instructions for the speaker assembly to emit audio content that seems to come from several different points in space. Note that in some embodiments, some or all of the controller is part on the console 615.

The electronic display 625 displays 2D or 3D images to the user in accordance with data received from the console 615. In various embodiments, the electronic display 625 comprises a single electronic display or multiple electronic displays (e.g., a display for each eye of a user). Examples of the electronic display 625 include: a liquid crystal display (LCD), an organic light emitting diode (OLED) display, an active-matrix organic light-emitting diode display (AMO-LED), some other display, or some combination thereof.

The optics block 630 magnifies image light received from the electronic display 625, corrects optical errors associated with the image light, and presents the corrected image light to a user of the headset 605. The electronic display 625 and the optics block 630 may be an embodiment of the lens 110. In various embodiments, the optics block 630 includes one or more optical elements. Example optical elements included in the optics block 630 include: an aperture, a Fresnel lens, a convex lens, a concave lens, a filter, a reflecting surface, or any other suitable optical element that affects image light. Moreover, the optics block 630 may include combinations of different optical elements. In some embodiments, one or more of the optical elements in the optics block 630 may have one or more coatings, such as partially reflective or anti-reflective coatings.

Magnification and focusing of the image light by the optics block 630 allows the electronic display 625 to be physically smaller, weigh less, and consume less power than larger displays. Additionally, magnification may increase the field of view of the content presented by the electronic display 625. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 630 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display 625 for display is pre-distorted, and the optics block 630 corrects the distortion when it receives image light from the electronic display 625 generated based on the content.

The DCA 640 captures data describing depth information for a local area surrounding the headset 605. In one embodiment, the DCA 640 may include a structured light projector, an imaging device, and a controller. The captured data may be images captured by the imaging device of structured light projected onto the local area by the structured light projector. In one embodiment, the DCA 640 may include two or more cameras that are oriented to capture portions of the local area in stereo and a controller. The captured data may be images captured by the two or more cameras of the local area in stereo. The controller computes the depth information of the local area using the captured data. Based on the depth information, the controller determines absolute positional information of the headset 605 within the local area. The DCA 640 may be integrated with the headset 605 or may be positioned within the local area external to the headset 605. In the latter embodiment, the controller of the DCA 640 may transmit the depth information to a controller of the audio system 620.

The IMU 645 is an electronic device that generates data indicating a position of the headset 605 based on measurement signals received from one or more position sensors 635. The one or more position sensors 635 may be an embodiment of the sensor device 115. A position sensor 635 generates one or more measurement signals in response to motion of the headset 605. Examples of position sensors 635 include: one or more accelerometers, one or more gyroscopes, one or more magnetometers, another suitable type of sensor that detects motion, a type of sensor used for error correction of the IMU 645, or some combination thereof. The position sensors 635 may be located external to the IMU 645, internal to the IMU 645, or some combination thereof.

Based on the one or more measurement signals from one or more position sensors 635, the IMU 645 generates data indicating an estimated current position of the headset 605 relative to an initial position of the headset 605. For example, the position sensors 635 include multiple accelerometers to measure translational motion (forward/back, up/down, left/right) and multiple gyroscopes to measure rotational motion (e.g., pitch, yaw, and roll). In some embodiments, the IMU 645 rapidly samples the measurement signals and calculates the estimated current position of the headset 605 from the sampled data. For example, the IMU 645 integrates the measurement signals received from the accelerometers over time to estimate a velocity vector and integrates the velocity vector over time to determine an estimated current position of a reference point on the headset 605. Alternatively, the IMU 645 provides the sampled measurement signals to the console 615, which interprets the data to reduce error. The reference point is a point that may be used to describe the position of the headset 605. The reference point may generally be defined as a point in space or a position related to the eyewear device's 605 orientation and position.

The IMU 645 receives one or more parameters from the console 615. As further discussed below, the one or more parameters are used to maintain tracking of the headset 605. Based on a received parameter, the IMU 645 may adjust one or more IMU parameters (e.g., sample rate). In some embodiments, data from the DCA 640 causes the IMU 645 to update an initial position of the reference point so it corresponds to a next position of the reference point. Updating the initial position of the reference point as the next calibrated position of the reference point helps reduce accumulated error associated with the current position estimated the IMU 645. The accumulated error, also referred to as drift error, causes the estimated position of the reference point to "drift" away from the actual position of the reference point over time. In some embodiments of the headset 605, the IMU 645 may be a dedicated hardware component. In other embodiments, the IMU 645 may be a software component implemented in one or more processors.

The I/O interface 610 is a device that allows a user to send action requests and receive responses from the console 615. An action request is a request to perform a particular action. For example, an action request may be an instruction to start or end capture of image or video data, start or end the audio system 620 from producing sounds, start or end a calibration process of the headset 605, or an instruction to perform a particular action within an application. The I/O interface 610 may include one or more input devices. Example input devices include: a keyboard, a mouse, a game controller, or any other suitable device for receiving action requests and communicating the action requests to the console 615. An action request received by the I/O interface 610 is communicated to the console 615, which performs an action corresponding to the action request. In some embodiments, the I/O interface 615 includes an IMU 645, as further described above, that captures calibration data indicating an estimated position of the I/O interface 610 relative to an initial position of the I/O interface 610. In some embodiments, the I/O interface 610 may provide haptic feedback to the user in accordance with instructions received from the console 615. For example, haptic feedback is provided when an action request is received, or the console 615 communicates instructions to the I/O interface 610 causing the I/O interface 610 to generate haptic feedback when the console 615 performs an action.

The console 615 provides content to the headset 605 for processing in accordance with information received from one or more of: the headset 605 and the I/O interface 610. In the example shown in FIG. 6, the console 615 includes an application store 650, a tracking module 655, and an engine 660. Some embodiments of the console 615 have different modules or components than those described in conjunction with FIG. 6. Similarly, the functions further described below may be distributed among components of the console 615 in a different manner than described in conjunction with FIG. 6.

The application store 650 stores one or more applications for execution by the console 615. An application is a group of instructions, that when executed by a processor, generates content for presentation to the user. Content generated by an application may be in response to inputs received from the user via movement of the headset 605 or the I/O interface 610. Examples of applications include: gaming applications, conferencing applications, video playback applications, calibration processes, or other suitable applications.

The tracking module 655 calibrates the system environment 600 using one or more calibration parameters and may adjust one or more calibration parameters to reduce error in determination of the position of the headset 605 or of the I/O interface 610. Calibration performed by the tracking module 655 also accounts for information received from the IMU 645 in the headset 605 and/or an IMU 645 included in the I/O interface 610. Additionally, if tracking of the headset 605 is lost, the tracking module 655 may re-calibrate some or all of the system environment 600.

The tracking module 655 tracks movements of the headset 605 or of the I/O interface 610 using information from the one or more sensor devices 635, the IMU 645, or some combination thereof. For example, the tracking module 655 determines a position of a reference point of the headset 605 in a mapping of a local area based on information from the headset 605. The tracking module 655 may also determine positions of the reference point of the headset 605 or a reference point of the I/O interface 610 using data indicating a position of the headset 605 from the IMU 645 or using data indicating a position of the I/O interface 610 from an IMU 645 included in the I/O interface 610, respectively. Additionally, in some embodiments, the tracking module 655 may use portions of data indicating a position or the headset 605 from the IMU 645 to predict a future location of the headset 605. The tracking module 655 provides the estimated or predicted future position of the headset 605 or the I/O interface 610 to the engine 660.

The engine 660 also executes applications within the system environment 600 and receives position information, acceleration information, velocity information, predicted future positions, audio information, or some combination thereof of the headset 605 from the tracking module 655. Based on the received information, the engine 660 determines content to provide to the headset 605 for presentation to the user. For example, if the received information indicates that the user has looked to the left, the engine 660 generates content for the headset 605 that mirrors the user's movement in a virtual environment or in an environment augmenting the local area with additional content. Additionally, the engine 660 performs an action within an application executing on the console 615 in response to an action request received from the I/O interface 610 and provides feedback to the user that the action was performed. The provided feedback may be visual or audible feedback via the headset 605 or haptic feedback via the I/O interface 610.

Additional Configuration Information

Embodiments according to the invention are in particular disclosed in the attached claims directed to a headset, a method, and a storage medium, wherein any feature mentioned in one claim category, e.g. headset, can be claimed in another claim category, e.g. method, storage medium, system and computer program product, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In an embodiment, a headset may comprise: a frame; and an audio system that includes: a microphone assembly positioned on the frame in a detection region, the detection region external to an ear of a user wearing the headset, and within a threshold distance from an ear canal of the ear, the microphone assembly configured to detect an audio signal emitted from an audio source in a local area, wherein the audio signal detected at the detection region is within a threshold degree of similarity of a sound pressure wave at the ear canal of the user, and an audio controller configured to determine a set of head-related transfer functions (HRTFs) based in part on the detected audio signal.

The microphone assembly may comprise a plurality of microphones.

In an embodiment, a headset may comprise at least one microphone, of the plurality of microphones, positioned on the frame at a location other than the detection region.

The threshold distance may be at most 3 inches.

The audio source may be a speaker that is part of the audio system.

The speaker may be positioned on the frame of the headset.

The audio source may be a transducer of a cartilage conduction system.

The audio source may be external to and separate from the headset and the audio signal may describe ambient sounds in a local area of the headset.

Frequencies of the audio signal may be less than or equal to 2 kHz.

The audio controller may be configured to:
estimate a direction of arrival (DoA) of a detected sound relative to a position of the headset within the local area; and update, based on the DoA estimation, the HRTF associated with the audio system for frequencies above 2 kHz.

In an embodiment, a method may comprise:
detecting, via a microphone assembly positioned within a detection region on a frame of a headset, an audio signal emitted from an audio source in a local area, wherein the detection region is external to an ear of a user wearing the headset and is within a threshold distance from an ear canal of the user, and the audio signal detected at the detection region is within a threshold degree of similarity of a sound pressure wave at the ear canal; and
determining, via an audio controller, a set of head-related transfer functions (HRTFs) based in part on the detected audio signal.

The headset may comprise an audio system, and the audio source may be a speaker that is part of the audio system.

Frequencies of the audio signal may be less than or equal to 2 kHz.

The audio source may be a transducer of a cartilage conduction system.

The audio signal may describe ambient sounds in a local area of the user.

In an embodiment, a method may comprise:
estimating a direction of arrival (DoA) of a detected sound relative to a position of the headset within the local area; and updating, based on the DoA estimation, the HRTF associated with the audio system for frequencies above 2 kHz.

In an embodiment, a non-transitory computer-readable medium may store instructions that, when executed by one or more processors, cause the one or more processors to perform operations comprising:
detecting, via a microphone assembly positioned within a detection region on a frame of a headset, an audio signal emitted from an audio source in a local area, wherein the detection region is external to an ear of a user wearing the headset and is within a threshold distance from an ear canal of the user, and the audio signal detected at the detection region is within a threshold degree of similarity of a sound pressure wave at the ear canal; and
determining, via an audio controller, a set of head-related transfer functions (HRTFs) based in part on the detected audio signal.

Frequencies of the audio signal may be less than or equal to 2 kHz.

The microphone assembly may comprise a plurality of microphones.

The audio controller may be configured to:
estimate a direction of arrival (DoA) of a detected sound relative to a position of the headset within the local area; and update, based on the DoA estimation, the HRTF associated with the audio system for frequencies above 2 kHz.

In an embodiment, one or more computer-readable non-transitory storage media may embody software that is operable when executed to perform a method according to or within any of the above mentioned embodiments.

In an embodiment, a system may comprise: one or more processors; and at least one memory coupled to the processors and comprising instructions executable by the processors, the processors operable when executing the instructions to perform a method according to or within any of the above mentioned embodiments.

In an embodiment, a computer program product, preferably comprising a computer-readable non-transitory storage media, may be operable when executed on a data processing system to perform a method according to or within any of the above mentioned embodiments.

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A headset comprising:
    a frame; and
    an audio system that includes:
        a microphone assembly positioned on the frame in a detection region, the detection region external to an ear of a user wearing the headset, and within a threshold distance from an ear canal of the ear, the microphone assembly configured to detect an audio signal caused by a sound emitted from an audio source in a local area, wherein the audio signal detected at the detection region includes a first portion in a first frequency band and a second portion in a second frequency band, wherein the first frequency band is lower than the second frequency band and the first portion of the audio signal is within a threshold degree of similarity of the first frequency band of a sound pressure wave at the ear canal of the user, and
        an audio controller configured to:
            infer sound pressure for the first frequency band at an entrance of the ear canal as being the sound pressure in the first frequency band described by the first portion of the audio signal; and
            determine a set of head-related transfer functions (HRTFs) based in part on the inferred sound pressure for the first frequency band.

2. The headset of claim 1, wherein the microphone assembly comprises a plurality of microphones.

3. The headset of claim 2, further comprising at least one microphone, of the plurality of microphones, positioned on the frame at a location other than the detection region.

4. The headset of claim 1, wherein the threshold distance is at most 3 inches.

5. The headset of claim 1, wherein the audio source is a speaker that is part of the audio system.

6. The headset of claim 5, wherein the speaker is positioned on the frame of the headset.

7. The headset of claim 1, wherein the audio source is a transducer of a cartilage conduction system.

8. The headset of claim 1, wherein the audio source is external to and separate from the headset and the audio signal describes ambient sounds in the local area of the headset.

9. The headset of claim 1, wherein frequencies of the audio signal are less than or equal to 2 kHz.

10. The headset of claim 1, wherein the audio controller is configured to:
    estimate a direction of arrival (DoA) of a detected sound relative to a position of the headset within the local area; and
    update, based on the DoA estimation, an HRTF of the set of HRTFs for frequencies above 2 kHz.

11. A method comprising:
    detecting, via a microphone assembly positioned within a detection region on a frame of a headset, an audio signal caused by a sound emitted from an audio source in a local area, wherein the detection region is external to an ear of a user wearing the headset and is within a threshold distance from an ear canal of the user, and the audio signal detected at the detection region includes a first portion in a first frequency band and a second portion in a second frequency band, wherein the first frequency band is lower than the second frequency band and the first portion of the audio signal is within a threshold degree of similarity of the first frequency band of a sound pressure wave at the ear canal;

inferring, via an audio controller, sound pressure for the first frequency band at an entrance of the ear canal as being the sound pressure in the first frequency band described by the first portion of the audio signal; and determining, via the audio controller, a set of head-related transfer functions (HRTFs) based in part on the inferred sound pressure for the first frequency band.

12. The method of claim 11, wherein the headset comprises an audio system, and wherein the audio source is a speaker that is part of the audio system.

13. The method of claim 11, wherein frequencies of the audio signal are less than or equal to 2 kHz.

14. The method of claim 11, wherein the audio source is a transducer of a cartilage conduction system.

15. The method of claim 11, wherein the audio signal describes ambient sounds in the local area of the user.

16. The method of claim 11, further comprising:
   estimating a direction of arrival (DoA) of a detected sound relative to a position of the headset within the local area; and
   updating, based on the DoA estimation, an HRTF of the set of HRTFs for frequencies above 2 kHz.

17. A non-transitory computer-readable medium storing instructions that, when executed by one or more processors, cause the one or more processors to perform operations comprising:
   detecting, via a microphone assembly positioned within a detection region on a frame of a headset, an audio signal caused by a sound emitted from an audio source in a local area, wherein the detection region is external to an ear of a user wearing the headset and is within a threshold distance from an ear canal of the user, and the audio signal detected at the detection region includes a first portion in a first frequency band and a second portion in a second frequency band, wherein the first frequency band is lower than the second frequency band and the first portion of the audio signal is within a threshold degree of similarity of the first frequency band of a sound pressure wave at the ear canal;
   inferring, via an audio controller, sound pressure for the first frequency band at an entrance of the ear canal as being the sound pressure in the first frequency band described by the first portion of the audio signal; and
   determining, via the audio controller, a set of head-related transfer functions (HRTFs) based in part on the inferred sound pressure for the first frequency band.

18. The non-transitory computer-readable medium of claim 17, wherein frequencies of the audio signal are less than or equal to 2 kHz.

19. The non-transitory computer-readable medium of claim 17, wherein the microphone assembly comprises a plurality of microphones.

20. The non-transitory computer-readable medium of claim 17, wherein the audio controller is configured to:
   estimate a direction of arrival (DoA) of a detected sound relative to a position of the headset within the local area; and
   update, based on the DoA estimation, an HRTF of the set of HRTFs for frequencies above 2 kHz.

* * * * *

UNITED STATES PATENT AND TRADEMARK OFFICE
CERTIFICATE OF CORRECTION

PATENT NO. : 10,848,891 B2  
APPLICATION NO. : 16/390405  
DATED : November 24, 2020  
INVENTOR(S) : Khaleghimeybodi et al.

Page 1 of 1

It is certified that error appears in the above-identified patent and that said Letters Patent is hereby corrected as shown below:

On the Title Page

Item (73), in Column 1, in "Assignee", Line 1, delete "Melno" and insert -- Menlo --, therefor.

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*